(12) United States Patent
Contardi et al.

(10) Patent No.: US 8,312,950 B2
(45) Date of Patent: Nov. 20, 2012

(54) MODULAR VEHICLE FRONT END WITH RESIN OVERMOLD BRACKET AND VEHICLE COMPRISING SAME

(75) Inventors: Mark Contardi, Farmington Hills, MI (US); Dave VanLooy, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 937 days.

(21) Appl. No.: 12/041,065

(22) Filed: Mar. 3, 2008

(65) Prior Publication Data

US 2009/0218852 A1 Sep. 3, 2009

(51) Int. Cl.
*B60K 11/04* (2006.01)
*F28F 9/013* (2006.01)
(52) U.S. Cl. .......................... 180/68.4; 165/67
(58) Field of Classification Search ............... 180/68.4, 180/68.6, 312, 68.1; 165/41, 42, 149, 67, 165/68
See application file for complete search history.

(56) References Cited

U.S. PATENT DOCUMENTS

| | | | |
|---|---|---|---|
| 2,235,806 A * | 3/1941 | Walker et al. ................... | 165/72 |
| 2,890,686 A * | 6/1959 | Cassell .......................... | 123/41.5 |
| 3,525,088 A * | 8/1970 | Thummel ....................... | 362/473 |
| 4,141,426 A | 2/1979 | Hamada et al. | |
| 4,428,447 A | 1/1984 | Malen | |
| 4,597,603 A | 7/1986 | Trabert | |
| 4,662,432 A * | 5/1987 | Suzuki .......................... | 165/41 |
| 4,940,281 A | 7/1990 | Komatsu | |
| 5,069,275 A * | 12/1991 | Suzuki et al. .................. | 165/67 |
| 5,106,148 A | 4/1992 | Ikeda et al. | |
| 5,209,290 A * | 5/1993 | Chigira ......................... | 165/149 |
| 5,271,473 A | 12/1993 | Ikeda et al. | |
| 5,358,304 A | 10/1994 | Kanemitsu et al. | |
| 5,429,182 A * | 7/1995 | Hanafusa ....................... | 165/67 |
| 5,441,100 A * | 8/1995 | Ueda et al. ..................... | 165/67 |
| 5,533,780 A | 7/1996 | Larson et al. | |
| 5,544,714 A | 8/1996 | May et al. | |
| 5,573,299 A * | 11/1996 | Masuda ......................... | 296/193.09 |
| 5,575,526 A | 11/1996 | Wycech | |
| 5,632,332 A * | 5/1997 | Hanafusa ....................... | 165/178 |
| 5,658,041 A | 8/1997 | Girardot et al. | |
| 5,668,351 A * | 9/1997 | Hanlon et al. .................. | 174/68.3 |
| 5,915,490 A | 6/1999 | Wurfel | |
| 6,450,276 B1 | 9/2002 | Latcau | |
| 6,513,579 B1 * | 2/2003 | Kent et al. ..................... | 165/67 |
| 7,530,386 B2 * | 5/2009 | Nagayama et al. ............. | 165/41 |
| 7,748,484 B2 * | 7/2010 | Matsushima et al. ........... | 180/68.4 |

* cited by examiner

*Primary Examiner* — J. Allen Shriver, II
*Assistant Examiner* — Bridget Avery
(74) *Attorney, Agent, or Firm* — Young, Basile, Hanlon & MacFarlane, P.C.

(57) ABSTRACT

A modular vehicle front end comprising a frame, a cooling unit mounted to the frame, a conduit running through the cooling unit, and a bracket for securing the conduit to the frame. The bracket can comprise an attachment portion configured for attachment to the frame and a retainer overmolded on the conduit. The bracket can further comprise at least one flexible clamp portion configured to receive and retain a second conduit. A vehicle comprising an engine and the modular front end taught herein is also disclosed.

23 Claims, 3 Drawing Sheets

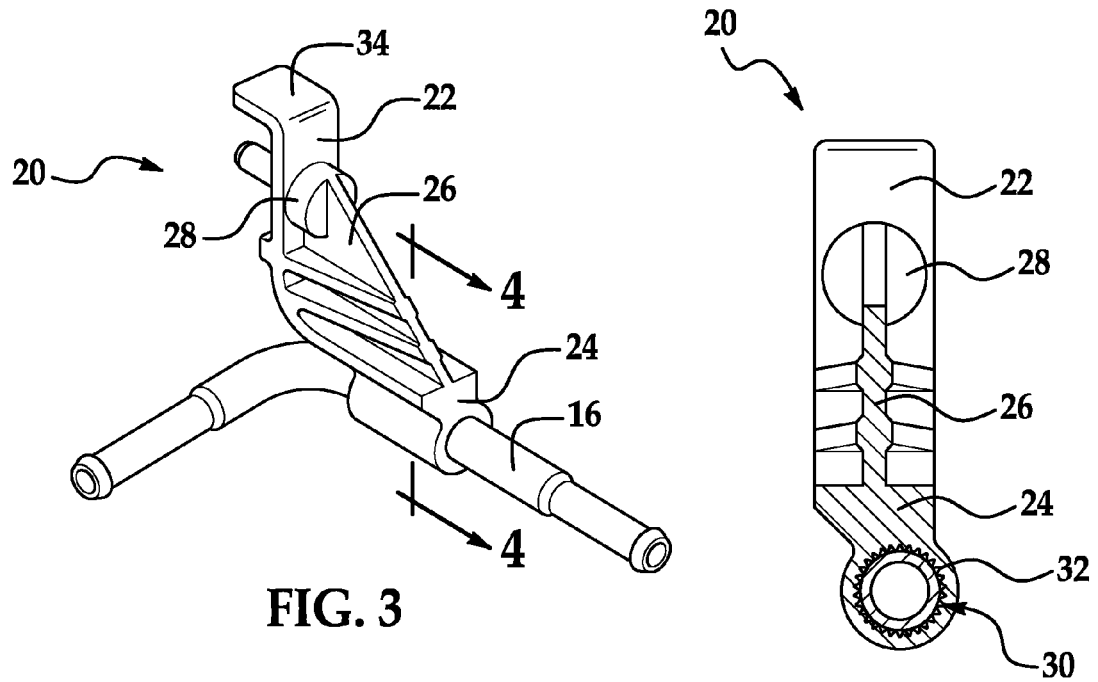
FIG. 3
FIG. 4
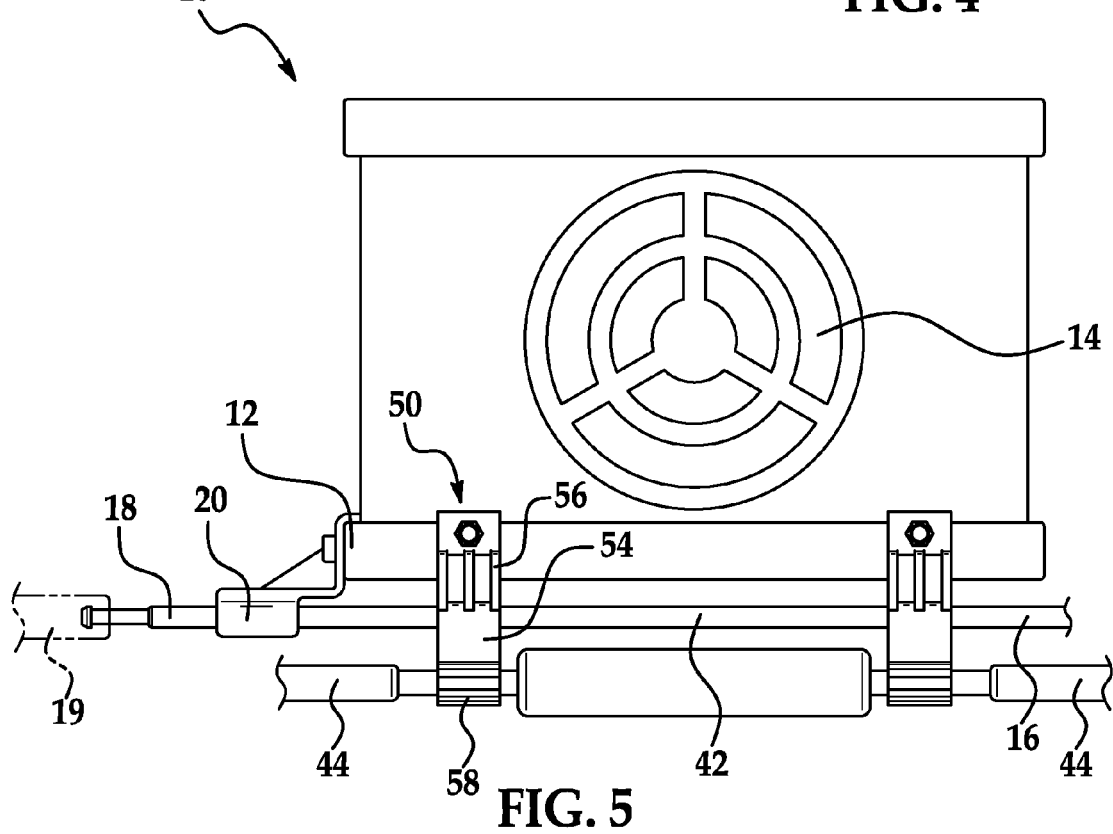
FIG. 5

MODULAR VEHICLE FRONT END WITH RESIN OVERMOLD BRACKET AND VEHICLE COMPRISING SAME

FIELD OF THE INVENTION

The present invention relates to the field of modular vehicle front ends with automatic transmission oil cooler tubes and brackets.

BACKGROUND

It has been realized that assembly of vehicles can be simplified by providing front end modules which include the vehicle cooling system. The front end module consists of a support assembly which may be of plastics or metal and may provide mountings for the vehicle bumper and headlamps. By manufacturing the support assembly and pre-fitting the cooling components to the module, alignment problems are reduced. Other advantages for the manufacturer can include reduction in the assembly time for a vehicle and space saving in assembly plants. Brackets, made of metal to withstand road salts and underbody applications, are used to secure cooling and other conduit, for example, to the frame during installation. The modules are loaded into the front end of the vehicle with fork lifts or overhead conveyors. The fork lifts and conveyors potentially damage components of the modular front end, particularly the metal brackets, by bending or breaking the components or brackets. Further, misalignment of certain components of the modular front end, or the front end itself, may occur due to the damage to the brackets, adding assembly time and cost to the modular installation.

SUMMARY

Embodiments of modular vehicle front ends with resin overmolded brackets are disclosed herein. One embodiment of a modular front end for a vehicle comprises a frame, a cooling unit mounted to the frame, a cooling conduit having an open end and running through the cooling unit and a bracket for securing the cooling conduit to the frame. The bracket comprises an attachment portion configured for attachment to the frame and a retainer overmolded on the cooling conduit.

In another of the disclosed embodiments, a modular front end for a vehicle comprises a frame, a cooling unit mounted to the frame, first and second conduits having open ends and running through the cooling unit and at least one bracket configured to secure the first and second conduits to the frame. The at least one bracket comprises an attachment portion configured for attachment to the frame, a retainer overmolded on the first conduit and at least one flexible clamp portion configured to receive and retain the second conduit.

Also disclosed is a vehicle comprising an engine and a modular front end. The modular front end is comprised of a frame, a cooling unit mounted to the frame, a cooling conduit running through the cooling unit and in fixed communication with the engine, and a bracket for securing the cooling conduit to the frame. The bracket comprises an attachment portion configured for attachment to the frame, a retainer overmolded on the cooling conduit and a reinforcement member configured to bear a load parallel to a longitudinal axis of the retainer without substantial flexing.

BRIEF DESCRIPTION OF THE DRAWINGS

The description herein makes reference to the accompanying drawings wherein like reference numerals refer to like parts throughout the several views, and wherein:

FIG. 3 is an exploded view of a resin overmolded bracket used in an embodiment of the modular front end disclosed herein;

FIG. 4 is a cross-sectional view of the resin overmolded bracket in FIG. 3 along line 4-4';

FIG. 5 is a frontal view of a vehicle front end module according to another embodiment disclosed herein;

DETAILED DESCRIPTION

In the various figures, like reference numbers refer to like parts.

Figure 1:
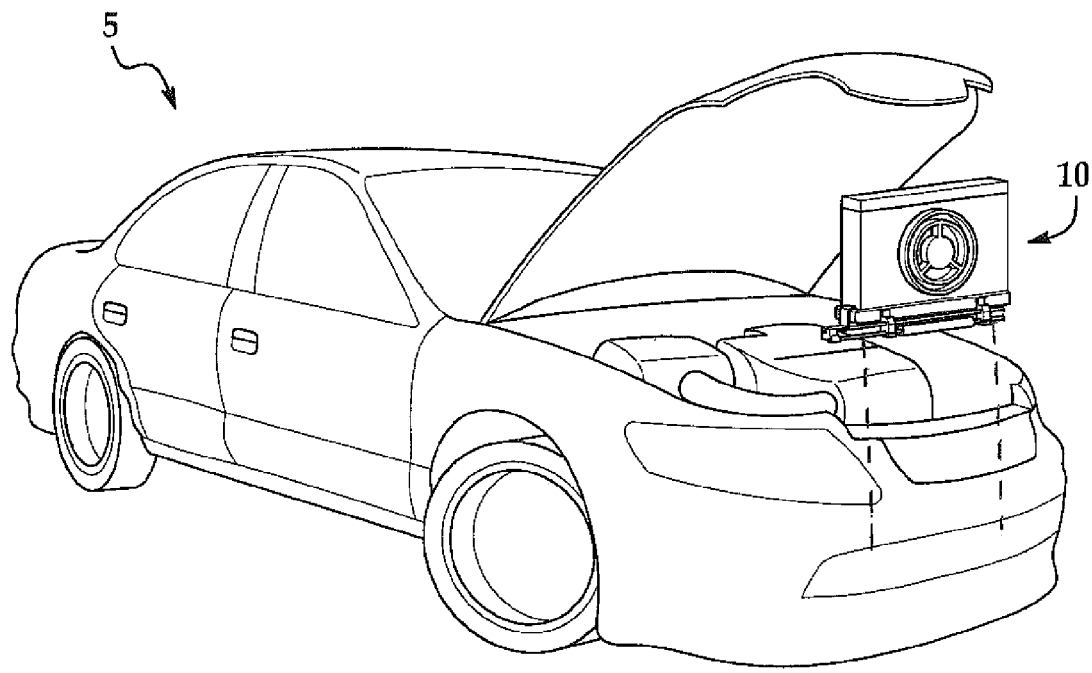
FIG. 1 is a perspective view of an assembled vehicle showing the location of the front end module.

FIG. 1 illustrates an assembled vehicle 5. An exploded view of a modular vehicle front end 10 illustrates the positioning of the modular front end 10 within the assembled vehicle 5. The vehicle 5 shown is provided by way of example and not limitation, and other suitable vehicles such as vans, trucks, and sport utility vehicles, may also incorporate the modular vehicle front end 10.

Figure 2:
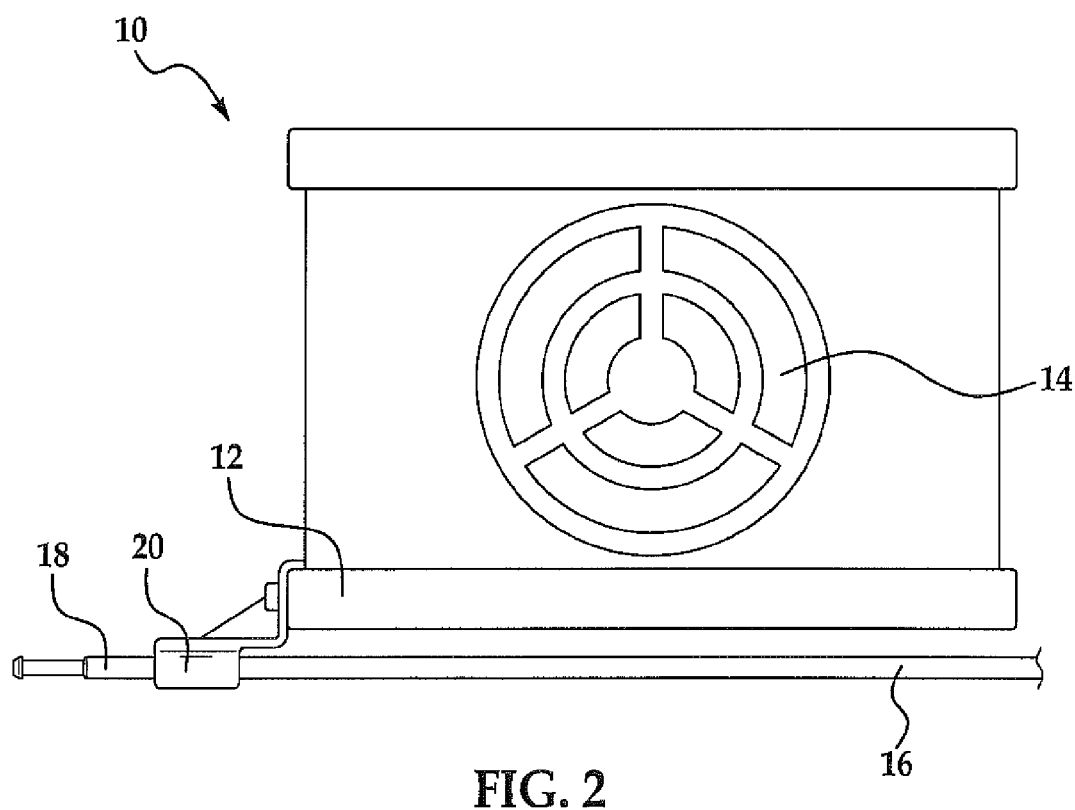
FIG. 2 is a frontal view of a vehicle front end module according to an embodiment disclosed herein.

FIG. 2 depicts an embodiment of the modular vehicle front end 10 disclosed herein. In FIG. 2, the modular vehicle front end 10 comprises a frame 12 with a cooling unit 14 mounted to the frame 12. The front end 10 further comprises a cooling conduit 16 running through the cooling unit 14. The cooling conduit 16 has an open end 18 configured for communication with a mated conduit 19 within the vehicle. The cooling conduit 16 can be coated with an anti-corrosion compound (not shown). An overmolded resin bracket 20 secures the cooling conduit 16 to the frame 12 of the modular front end 10 in an exposed location on the frame 12 to allow access to the bracket 20 for underbody line attachment after the modular front end 10 is installed into a vehicle 5. The overmolded resin bracket 20 can also be coated with an anti-corrosion compound.

Embodiments of the modular vehicle front end 10 disclosed herein can further comprise additional components as desired or required by the manufacturer. As non-limiting examples, a front headlamp system or bumper connections can be included in the modular front end 10. The shape, orientation and attachment of the frame and cooling unit as depicted in FIG. 2 are provided by way of example and not limitation, and other suitable shapes, orientations and attachments of the frame 12 and cooling unit 14 known in the art may be used depending on component packaging and vehicle layout. In addition, the cooling unit 14 shown in FIG. 2 is provided by way of example and not limitation, and other cooling configurations and layouts can be used as desired or required.

Referring to FIG. 3, the overmolded resin bracket 20 comprises an attachment portion 22 configured for attachment to the frame (not shown), a retainer 24 overmolded on the cooling conduit 16, and a reinforcement member 26. The attachment portion 22 can comprise a molded fastener 28. FIG. 4 is a cross-sectional view of the overmolded resin bracket 20 of FIG. 3 along line 4-4'. As seen in FIG. 4, cooling conduit 16 has an outer surface 30 that can contain undulations 32 configured to contact and form a seal between the cooling conduit 16 and the retainer 24 when the bracket 20 is overmolded. The undulations 32 depicted in FIG. 4 are provided by way of example and not limitation, and other configurations such as channels or grooves can be used as desired or required.

The attachment portion 22 as shown in FIGS. 3 and 4 includes a molded fastener 28. This reduces the need for welding during assembly of the modular front end 10, decreasing assembly time and cost. However, it is contemplated that a traditional bore may be provided in the attachment portion 22 configured to receive a fastener such as a bolt. The attachment portion seen in FIG. 3 also includes an elbow portion 34 at the end opposite the retainer 24. This elbow portion 34 can be used to position the bracket 20 on the frame 12. The elbow portion 34 can also provide reinforcement against loads on the bracket 20 during installation of the modular vehicle front end 10. However, it is contemplated that embodiments with no elbow portion 34 can also be incorporated into the modular vehicle front end 10 as desired or required.

The bracket 20 is made of material that can be molded in a process such as injection molding. Suitable materials include, but are not limited to, impact resistant and salt resistive thermoplastic elastomers and polyamides. Examples of suitable polyamides include, but are not limited to, Nylon 66 and Nylon 612. An example of a suitable thermoplastic elastomer includes Hytrel®, an engineering thermoplastic elastomer produced by DuPont. These materials are provided by way of example and not limitation, and other thermoplastic elastomers or polyamides known by those skilled in the art can be used. The material can further comprise reinforcing fibers or other similar fillers if desired or required.

The material of the bracket 20 can prevent damage to the bracket 20 such as breaking or bending during transportation and installation of the modular front end 10. This eliminates the need to replace brackets 20 either before installation or after installation, thereby reducing maintenance and parts, time and cost.

The bracket 20 can be overmolded on the cooling conduit 16 to form a tight seal between the retainer 14 of the bracket 20 and the conduit. This reduces the need for welding during assembly of the modular front end 10. The material used to make the overmolded bracket 20 provides impact resistance and flexibility such that the bracket 20 can withstand force applied to it during the assembly and installation process. Examples of forces that can be applied to the bracket 20 of the modular front end 10 include force applied during transportation prior to installation, force applied during positioning within the vehicle 5, and force applied during connecting between the modular components the components of the vehicle 5. The material used and the overmolded design can decrease the weight of the bracket 20 and overall modular front end 10 as well.

The reinforcement member 26 shown in FIG. 3 is designed such that its position within the bracket 20 works in concert with the material used to make the bracket 20. The reinforcement member 26 is configured to bear a load parallel to a longitudinal axis of the retainer 24 without substantial flexing. Such a load can be imposed, for example, when the open end 18 of the cooling conduit 16 is connected to the mating conduit 19 in the vehicle. The reinforcement member 26 is also configured to flex under a load perpendicular to the longitudinal axis of the retainer 24. Such a load can be imposed, for example, by a fork lift during lifting, placing, or transportation.

A second embodiment of the modular vehicle front end 10 disclosed herein is depicted in FIG. 5. As in the first embodiment, the modular vehicle front end 40 comprises a frame 12 with a cooling unit 14 mounted to the frame 12. The modular front end 40 further comprises a first conduit 42 and a second conduit 44 running through the cooling unit 14. The first conduit 42 has an open end configured for communication with a mated conduit within the vehicle. The second conduit 44 can have an open end or be continuous within the modular front end depending on the particular conduit and as desired or required. Both the first and second conduits 42, 44 can be coated with an anti-corrosion compound (not shown). At least one overmolded resin bracket 50 secures both the first and second conduits 42, 44 to the frame 12 of the modular front end 40. The overmolded resin bracket 50 can also be coated with an anti-corrosion compound.

Figure 6:
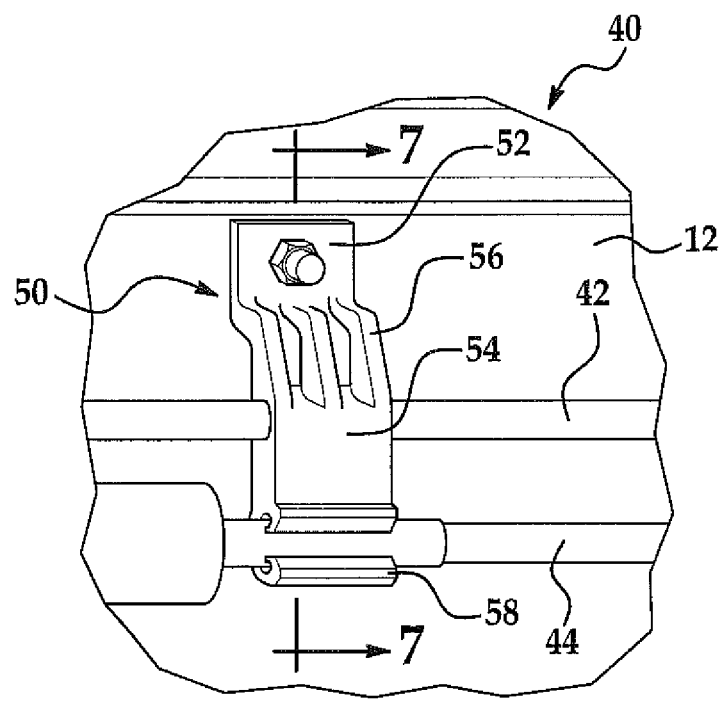
FIG. 6 is an exploded view of a different embodiment of a resin overmolded bracket used in an embodiment of the modular front end disclosed herein.

Referring to FIG. 6, the overmolded resin bracket 50 comprises an attachment portion 52 configured for attachment to the frame 12, a retainer 54 overmolded on the first conduit 42, at least one reinforcement member 56, and at least one flexible clamp portion 58 configured to receive and retain the second conduit 44. FIG. 6 illustrates the use of one flexible clamp portion 58, but the use of more than one clamp portion 58 extending from the retainer portion 54 in either the same or a different direction is contemplated.

Figure 7:
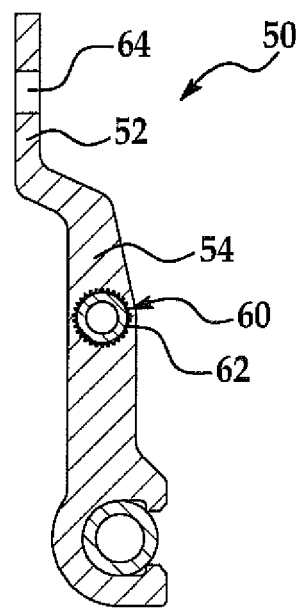
FIG. 7 is a cross-sectional view of the resin overmolded bracket in FIG. 6 along line 7-7'.

FIG. 7 is a cross-sectional view of the overmolded resin bracket 50 of FIG. 6 along line 7-7'. As seen in FIG. 7, the conduit 42 has an outer surface 60 that can contain undulations 62 configured to contact and form a seal between the first conduit 42 and the retainer 54 when the bracket 50 is overmolded. The undulations 62 depicted in FIG. 7 are provided by way of example and not limitation, and other configurations such as channels or grooves can be used as desired or required.

The attachment portion 52 can comprise a bore 64 sized and configured to accommodate a removable fastener (shown in FIG. 6) such as a screw or bolt, for attaching the bracket 50 to the frame 12.

The first and second conduits 42, 44 can be, for example, cooling conduit, power steering conduit or tubing, automatic transmission tubing, oil tubing or conduit, and radiator conduit. The tubing and conduit are provided by way of example and not limitation, and the first and second conduits 42, 44 can be other tubing or conduit desired or required in a modular front end 40 as known by those skilled in the art.

The bracket 50, as in the first embodiment, is made of material that can be molded in a process such as injection molding. Suitable materials include, but are not limited to, impact resistant thermoplastic elastomers and polyamides. Examples of suitable polyamides include, but are not limited to, Nylon 66 and Nylon 612. An example of a suitable thermoplastic elastomer includes Hytrel®, an engineering thermoplastic elastomer produced by DuPont. These materials are provided by way of example and not limitation, and other thermoplastic elastomers or polyamides known by those skilled in the art can be used. The material can further comprise reinforcing fibers or other similar fillers if desired or required.

The bracket 50 can be overmolded on the first conduit 42 to form a tight seal between the retainer 54 of the bracket 50 and the conduit 42. This reduces the need for welding during assembly of the modular front end 40. The material used to make the overmolded bracket 50 provides impact resistance and flexibility such that the bracket 50 can withstand force applied to it during the assembly and installation process. Examples of forces that can be applied to the bracket 50 of the modular front end 40 include force applied during transportation prior to installation, force applied during positioning within the vehicle 5, and force applied during connecting between the modular front end 40 and the components of the vehicle 5. The material used and the overmolded design can decrease the weight of the bracket 50 and overall modular front end 40 as well.

One or more reinforcement members 56 can be incorporated into the bracket 50. As shown in FIG. 6, three reinforcement members 56 are utilized. The at least one reinforcement member 56 is designed such that its position within the bracket 50 works in concert with the material used to make the bracket 50. The reinforcement member 56 is configured to bear a load parallel to a longitudinal axis of the retainer 54 without substantial flexing. Such a load can be imposed, for example, when the open ends of the first or second conduits 42, 44 are connected to their mating conduits 19 in the vehicle 5. The reinforcement member 56 is also configured to flex under a load perpendicular to the longitudinal axis of the retainer 54. Such a load can be imposed, for example, by a fork lift during lifting, placing, or transportation. Another load perpendicular to the retainer 54 is imposed when the second conduit 44 is snapped or forced into the at least one clamp portion 58 of the bracket 50.

An alternative embodiment of the modular vehicle front ends disclosed herein is a modular front end comprising at least one of the brackets 20 disclosed in the first embodiment and at least one of the brackets 50 disclosed in the second embodiment.

Also disclosed herein is a vehicle 5 comprising an engine and a modular front end 10, 40 of either the first or second embodiments or a modular front end the alternative embodiment.

The configuration of the retainer 24, 54, attachment portion 22, 52 and reinforcement member 26, 56 of the first and second embodiments, and additionally the clamp portion 58 in the second embodiment, are depicted as they are in the figures by way of example only and are not meant to be limiting. The configuration of the elements with respect to one another may differ depending on the configuration of the frame 12 and components of the modular front end 10, 40.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular front end for a vehicle comprising:
   a frame;
   a cooling unit mounted to the frame;
   a cooling conduit having an open end, the cooling conduit running through the cooling unit; and
   a bracket for securing the cooling conduit to the frame, wherein the bracket comprises:
      an attachment portion configured for attachment to the frame; and
      a retainer overmolded and forming one cohesive component with the cooling conduit, wherein the open end of the cooling conduit extends past and is spaced apart from the retainer.

2. The modular front end of claim 1, wherein the attachment portion comprises a molded bolt configured to attach the bracket to the frame.

3. The modular front end of claim 1, wherein the bracket further comprises a reinforcement member extending from the attachment portion to the retainer and configured to bear a load parallel to a longitudinal axis of the retainer without substantial flexing.

4. The modular front end of claim 1, wherein the bracket further comprises a reinforcement member extending from the attachment portion to the retainer and configured to flex under a load perpendicular to a longitudinal axis of the retainer.

5. The modular front end of claim 1, wherein the bracket is configured to position in a vehicle the open end of the cooling conduit to receive a mating conduit in the vehicle.

6. The modular front end of claim 1 further comprising:
   a second conduit; and
   at least one second bracket configured to secure the cooling conduit and second conduit to the frame, wherein the at least one second bracket comprises:
      an attachment portion configured for attachment to the frame;
      a retainer overmolded and forming one cohesive component with the cooling conduit; and
      at least one flexible clamp portion configured to receive and retain the second conduit.

7. The modular front end of claim 1, wherein the retainer in which the cooling conduit is overmolded extends parallel to a longitudinal axis of the cooling unit.

8. The modular front end of claim 1, wherein the attachment portion attaches to the frame so that the retainer is positioned between the cooling unit and the open end of the cooling conduit relative to a longitudinal axis of the cooling unit.

9. The modular front end of claim 1, wherein the bracket is molded as a single piece to the cooling conduit.

10. The modular front end of claim 3, wherein the reinforcement member is further configured to flex under a load perpendicular to the longitudinal axis of the retainer.

11. The modular front end of claim 6, wherein the attachment portion comprises a bore extending therethrough and sized and configured to accommodate a fastener suitable to attach the bracket to the frame.

12. The modular front end of claim 6, wherein the at least one second bracket further comprises a reinforcement member configured to bear a load parallel to a longitudinal axis of the retainer without substantial flexing.

13. The modular front end of claim 6, wherein the at least one second bracket further comprises a reinforcement member configured to flex under a load perpendicular to the retainer along a longitudinal axis.

14. The modular front end of claim 12, wherein the reinforcement member is further configured to flex under a load perpendicular to the retainer along the longitudinal axis.

15. The modular front end of claim 8, wherein a longitudinal axis of the retainer is parallel to the longitudinal axis of the cooling unit.

16. A modular front end for a vehicle comprising:
   a frame;
   a cooling unit mounted to the frame;
   a cooling conduit having an open end, the cooling conduit running through the cooling unit; and
   a bracket for securing the cooling conduit to the frame, wherein the bracket comprises:
      an attachment portion configured for attachment to the frame; and
      a retainer overmolded on the cooling conduit, wherein the cooling conduit has an outer surface comprising at least one of undulations, grooves, channels and protrusions that sealingly contact the retainer when the retainer is overmolded.

17. A vehicle comprising:
a modular front end comprised of a frame, a cooling unit mounted to the frame, a cooling conduit running through the cooling unit, and a first bracket molded as a single piece to the cooling conduit for securing the cooling conduit to the frame, wherein the first bracket comprises:
an attachment portion configured for attachment to the frame;
a retainer overmolded and forming one cohesive component with the cooling conduit; and
a reinforcement member configured to bear a load parallel to a longitudinal axis of the retainer without substantial flexing.

18. The vehicle of claim 17, wherein the vehicle further comprises a second conduit and the first bracket further comprises a flexible clamp portion configured to receive and retain the second conduit.

19. The vehicle of claim 17 further comprising a second conduit and a second bracket configured to secure the cooling conduit and second conduit to the frame, wherein the second bracket comprises:
an attachment portion configured for attachment to the frame;
a retainer overmolded and forming one cohesive component with the cooling conduit;
at least one reinforcement member; and
at least one flexible clamp portion configured to receive and retain the second conduit, and wherein the first bracket is positioned proximate an end of the cooling conduit.

20. The vehicle of claim 17, wherein the cooling conduit has an outer surface comprising at least one of undulations, grooves, channels and protrusions that sealingly contact the retainer when the retainer is overmolded.

21. The vehicle of claim 17, wherein the retainer in which the cooling conduit is overmolded extends parallel to a longitudinal axis of the cooling unit.

22. The vehicle of claim 17, wherein the attachment portion attaches to the frame so that the retainer is positioned between the cooling unit and the open end of the cooling conduit relative to a longitudinal axis of the cooling unit.

23. The vehicle of claim 22, wherein a longitudinal axis of the retainer is parallel to the longitudinal axis of the cooling unit.

* * * * *